US009766056B2

(12) United States Patent
Takiguchi et al.

(10) Patent No.: US 9,766,056 B2
(45) Date of Patent: Sep. 19, 2017

(54) APPARATUS AND METHOD FOR MONITORING MOVING OBJECTS IN SENSING AREA

(71) Applicants: DENSO WAVE INCORPORATED, Chita-gun, Aichi-pref. (JP); DENSO CORPORATION, Kariya, Aichi-pref. (JP)

(72) Inventors: Masahiro Takiguchi, Anjo (JP); Tetsuya Iwasaki, Tokyo (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 14/780,887

(22) PCT Filed: Mar. 19, 2014

(86) PCT No.: PCT/JP2014/057621
§ 371 (c)(1),
(2) Date: Sep. 28, 2015

(87) PCT Pub. No.: WO2014/156909
PCT Pub. Date: Oct. 2, 2014

(65) Prior Publication Data
US 2016/0040979 A1    Feb. 11, 2016

(30) Foreign Application Priority Data
Mar. 29, 2013    (JP) .................................. 2013-070905

(51) Int. Cl.
*G01B 11/14*    (2006.01)
*G01B 11/00*    (2006.01)
(Continued)

(52) U.S. Cl.
CPC ................ *G01B 11/00* (2013.01); *G01P 3/36* (2013.01); *G01P 13/045* (2013.01); *G01S 17/42* (2013.01); *G01S 17/58* (2013.01); *G08B 13/187* (2013.01)

(58) Field of Classification Search
CPC . B61L 23/00; G06T 7/20; G06T 2207/30232; G06T 2207/20012;
(Continued)

(56) References Cited

U.S. PATENT DOCUMENTS

2007/0217780 A1    9/2007    Hirooka et al.
2008/0166023 A1*   7/2008    Wang ........................ G06T 7/20
                                                                382/107

(Continued)

FOREIGN PATENT DOCUMENTS

JP          3011121 B2     2/2000
JP       2005-347926 A    12/2005
(Continued)

OTHER PUBLICATIONS

Jun. 17, 2014 International Search Report issued in International Patent Application No. PCT/JP2014/057621.

*Primary Examiner* — Sunghee Y Gray
(74) *Attorney, Agent, or Firm* — Oliff PLC

(57) ABSTRACT

In a monitoring apparatus, an optical sensor senses objects present in a sensing area, and moving speeds and moving directions of the objects are calculated based on changes with time in positional information of the sensed objects. An object which meets a predetermined moving condition is determined as a moving object. Hence an entrance of the moving object into the sensing area can be monitored. In this apparatus, by a determining section, it is determined whether or not an object is sensed in an area (after-passage sensing area) which is set to include positions adjacent to positions through which the sensed moving object has passed. When (Continued)

the object has been sensed in the area, by the determining section, it is further determined whether or not the object has remained for a predetermined determination period of time or more. This determined result is outputted by an outputting section.

8 Claims, 15 Drawing Sheets

(51) Int. Cl.
*G01S 17/42* (2006.01)
*G08B 13/187* (2006.01)
*G01S 17/58* (2006.01)
*G01P 3/36* (2006.01)
*G01P 13/04* (2006.01)

(58) Field of Classification Search
CPC ...... G06T 1/054; G06K 9/00771; G08G 1/04; G08G 1/054; G01B 11/00; G01P 3/36; G01S 17/42; G01S 17/58

USPC .......................................................... 356/614
See application file for complete search history.

(56) References Cited

U.S. PATENT DOCUMENTS

| 2010/0177963 | A1* | 7/2010 | Yokomitsu | B61L 23/00 382/170 |
| 2013/0215270 | A1* | 8/2013 | Murashita | B60R 1/00 348/148 |

FOREIGN PATENT DOCUMENTS

| JP | 2010-015258 A | 1/2010 |
| JP | 4727338 B2 | 7/2011 |
| JP | 2012-073856 A | 4/2012 |
| JP | 2012-230595 A | 11/2012 |

* cited by examiner

FIG.12
(a) 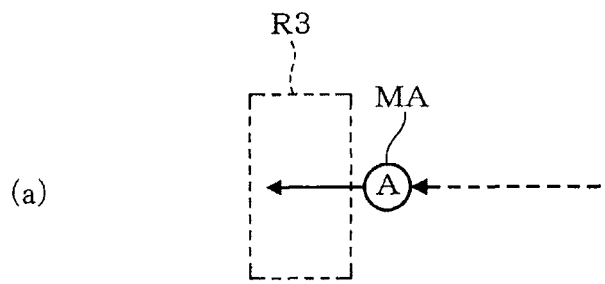
(b) 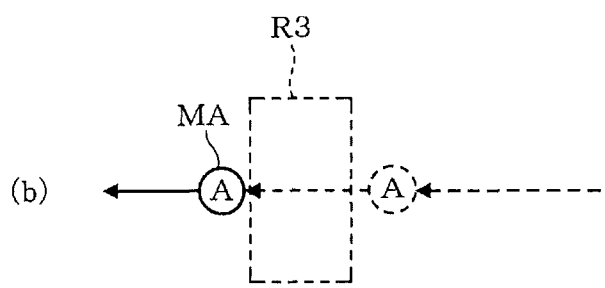

APPARATUS AND METHOD FOR MONITORING MOVING OBJECTS IN SENSING AREA

CROSS REFRENCE TO RELATED APPLICATION

This application is based on and claims the benefit of priority from earlier Japanese Patent Application No. 2013-070905 filed Mar. 29, 2013, the description of which is incorporated herein by reference.

TECHNICAL FIELD

The present invention relates to an apparatus and a method for monitoring objects in a sensing area, and in particular, to an apparatus and a method for monitoring objects in a sensing area with use of an optical sensor.

BACKGROUND ART

Recently there has been growing a need for monitoring behaviors of objects in a necessary sensing area (or monitoring area) and conditions in the area. Convectional systems for such monitoring are known as various types of systems.

BACKGROUND

For example, PTL 1 provides a system for sensing intrusion of objects into a sensing area. In this system, in order to remove obstacles present in the sensing area from sensed information, the obstacles are previously registered as background data. A subtraction between ranging data acquired by scanning the sensing area and background data is performed to obtain signals showing intrusion of objects.

Another system is shown by PTL 2, in which motions of objects sensed and stationary objects are removed from such objects, which leads to sensing only the moving objects.

CITATION LIST

Patent Literature

[PTL 1] JP-B-4727388
[PTL 2] JP-B-3011121

Technical Problem

Meanwhile, in recent years, in order to raise the level of security, there are needs for not only simply sensing an object's intrusion into a sensing area but also sensing leaving objects behind or taking objects way.

However, the conventional systems cannot take care of such growing demands well. In the case of PTL 1, it is required to previously register the background data in advance. In addition, in cases where new objects are brought in or the layout of objects is changed, the background data should also be updated in the system. Without updating such background data, objects newly brought in and objects whose layouts are changed are always sensed as being abnormal objects. This results in poor security performance, in which leaving objects behind or taking objects way cannot be detected due to discrepancy between the reference background data and actually acquired image data. That is, to meet a demand for detecting such object leaving-behind and/or object taking-way events, the background data should always be kept up to date. This leads to more maintenance work in operating monitoring systems. Meanwhile, the system shown by PTL 2 aims to monitor only moving objects, so that this system cannot detect objects other than moving objects, failing to meet demands for detecting object leaving-behind and/or object taking-way events.

SUMMARY

Thus it is desired to provide a monitoring apparatus capable of detecting object leaving-behind and/or object taking-way in a sensing area, without labor effort in operating the apparatus, such as update of background data.

In one aspect of the monitoring apparatus according to the present disclosure, it is determined whether or not objects are sensed in an after-passage (or transit) sensing area and, further, whether or not, when objects are sensed in the after-passage sensing area, the sensed objects remain at the sensed position in the after-passage sensing area for a predetermined determination period of time or more, the after-passage sensing area being set to positionally include positions adjacent to a passage position through which the determined moving object has passed; and determined results are then outputted.

It is usual that, when moving along a desired track in which an object (i.e., a stationary object) exists, a moving object moves while avoiding such an object. Hence, conversely, if the object is sensed in an after-passage sensing area, it is considered that the object was not present before the passage of the moving object, because the after-passage sensing area is set to positionally include a track along which the moving object has moved. Practically the after-passage sensing area is set to be an area in which the moving object cannot avoid contact with the stationary object if the moving object goes without changing the current track. Accordingly, it is considered that the object (the stationary object) sensed in the after-passage sensing area is an object left behind by the moving object.

In this case, it is also assumed that different moving objects intersect with each other, such as a case where persons pass each other, for example. However, in such a case, the respective moving objects move at the same time, and it is considered that there is no case in which the moving object is detected continuously in the after-passage sensing area. That is, it can be determined that the object which has been sensed continuously in the after-passage sensing area for a predetermined determination period of time or more is a stationary object. If there is a stationary object in the track, it is assumed that the moving object moves while avoiding such a stationary object, because the stationary object has been present in the track from the beginning. Hence, when an object sensed in the after-passage sensing area is a stationary object, in other words, when an object which was not avoided by the moving object is sensed on the movement trajectory of the moving object, it can be determined that the stationary object was not present before the passage of the moving object. Such an object, which is determined as a stationary object, can also be determined as an object which has been left behind by the moving object.

Accordingly, the monitoring apparatus can detect an event of leaving an object behind, based on the foregoing determination of whether or not an object is sensed in the after-passage sensing area for a determination period of time or more. In this case, the monitoring apparatus determines occurrence of a leaving-being event in an ex-post manner, and there no need to register background data beforehand, whereby it is possible to sense an object leaving-behind event in the sensing area without manually registering the background data.

It is also possible to meet a demand of sensing an object leaving-behind event occurring in the sensing area, thus raising the level of security.

As a preferable example, the after-passage sensing area can be set to include an undetectable area in which the optical sensor cannot sense objects in the sensing area, due to interruption of its field of view caused by moving objects.

When a moving object moves in the sensing area, the field of view of the optical sensor may be interrupted, which will disable the optical sensor from detecting objects which are present farther than such a moving object (i.e., in this interruption case, the optical sensor cannot monitor objects). If such a case happens, objects may be left behind in the undetectable area. With consideration for this probability, the after-passage sensing area is set to include the undetectable area of the optical sensor. By this setting, occurrence of leaving an object behind can be sensed well, based on determining whether or not an object is sensed in the after-passage sensing area for a predetermined determination period of time or more.

According to other aspect, a determination scheme is provided, which a) determines, based on i) whether or not objects have been sensed in a before-passage sensing area, the before-passage sensing area being set to positionally include positions adjacent to positions expecting passage of the sensed moving object and ii) whether or not objects have been sensed in the before-passage sensing area provided after the moving object has passed, whether or not sensed states of the objects in the before-passage sensing area change between before and after the passage of the moving object, and b) determines that an taking-away event occurs when the sensed states of the objects in the before-passage sensing area show a state change of, at least, part of the objects from existence to non-existence, and determining that a leaving-behind event occurs when the sensed states of the objects in the before-passage sensing area show a state change of, at least, part of the objects from non-existence to existence.

Normally, detecting an object taking-away event necessitates previous sensing existence of objects. However, in previously registering background data, which is seen in the conventional technique, a large amount of labor is required for running the system. In contrast, the monitoring apparatus according to this aspect is able to determine whether or not sensed states for an object have changed between before and after the passage of the moving object, and output the determined results if there are changes in the sensed states. Hence it is possible to detect both taking-way and leaving-behind events of objects.

In this case, the monitoring apparatus obtains sensed states of an object and performs the determination based on the obtained sensed states. Previous registration of the background data is not required, saving labor in running the system.

In this aspect, it is also possible to meet a demand of sensing an object leaving-behind event occurring in the sensing area, thus raising the level of security.

In this aspect, as a preferable example, the before-passage sensing area can be set to include an undetectable area in which the optical sensor cannot sense objects in the sensing area, due to interruption of its field of view caused by moving objects.

When a moving object moves in the sensing area, the field of view of the optical sensor may be interrupted, which will disable the optical sensor from detecting objects which are present farther than such a moving object (i.e., in this interruption case, the optical sensor cannot monitor objects). If such a case happens, objects may be left behind in the undetectable area or taken away from the undetectable area. With consideration for this probability, the before-passage sensing area is set to include the undetectable area of the optical sensor. By this setting, occurrence of taking objects away or leaving objects behind can be sensed well, based on comparison of the sensed states of objects between before and after the passage of the moving object.

BRIEF DESCRIPTION OF DRAWINGS

In the accompanying drawings:

FIG. 12 is a view pictorially showing a before-passage sensing area;

DESCRIPTION OF EMBODIMENTS

Figure 1:
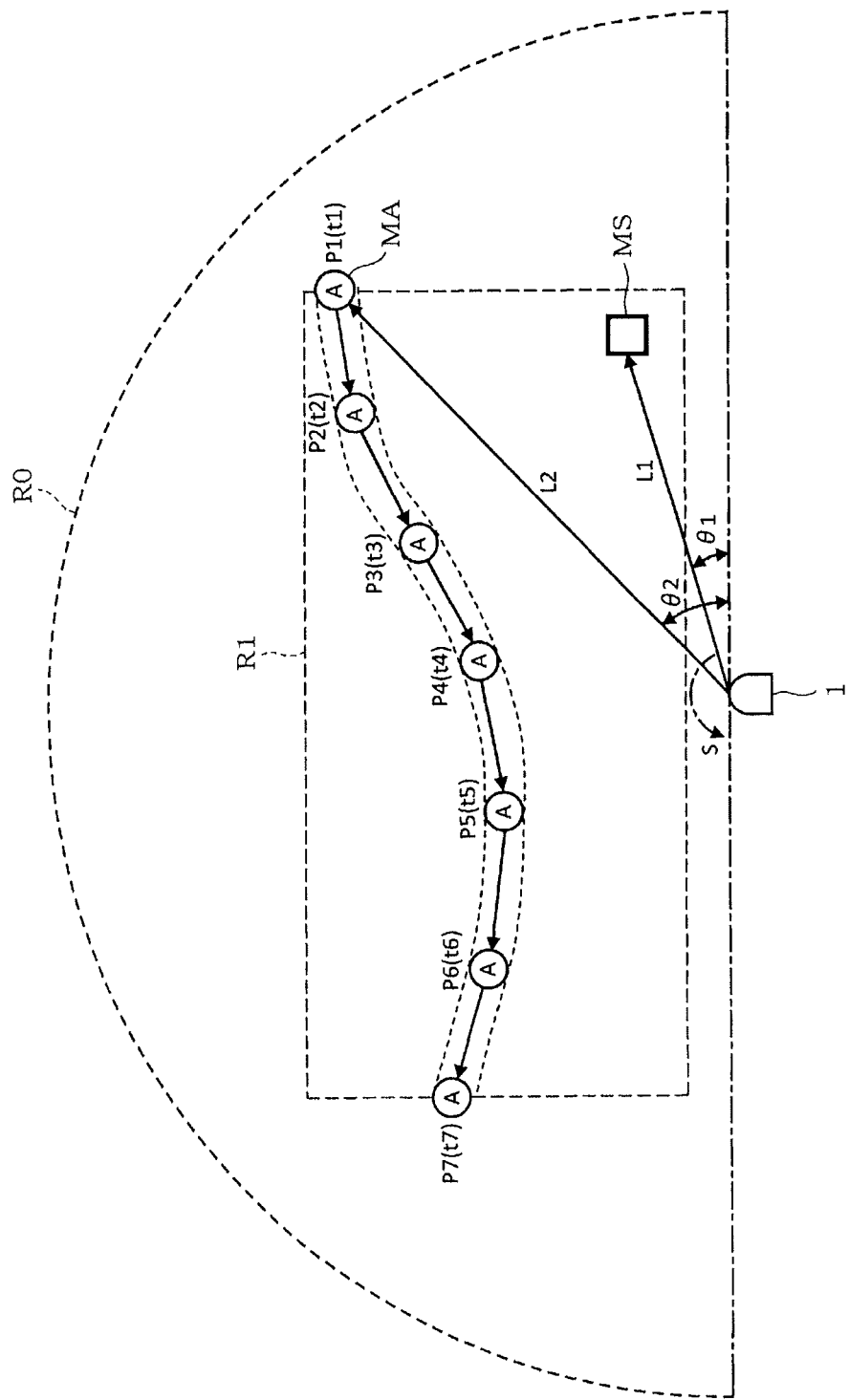
FIG. 1 is a plane view illustrating a sensing area being monitored by an area sensor device according to a first embodiment.

Referring now to the accompanying drawings, various embodiments of the present invention will now be described. In the following embodiments, components which are substantially in common are given the same reference numerals so that redundant explanations are omitted.

[First Embodiment]

With reference to FIGS. 1 to 9, a first embodiment of the present invention will now be described.

As shown in FIG. 1, there is provided an area sensor device 1 which composes a monitoring apparatus according to the present embodiment. The area sensor device 1 scans a scan area RO in a direction shown by an arrow S to detect objects. A sensing area R1, which is to be monitored, is designated in the scan area RO. In FIG. 1, symbols such as P1(t1) attached to for example a moving object MA means that the moving object has been detected at a position P1 at a time t1. In FIG. 1, it is illustrated that the moving object MA has been detected at positions P1 to P7 at times t1 to t7, respectively. Hereinafter, for sake of a simplified explanation, a moving object which has been detected at a position P1 and at a time t1, for example, is referred to as an object P1(t1). An object MS shown in FIG. 1 is a stationary object (such as a fixed obstacle) present in the sensing area R1.

Figure 2:
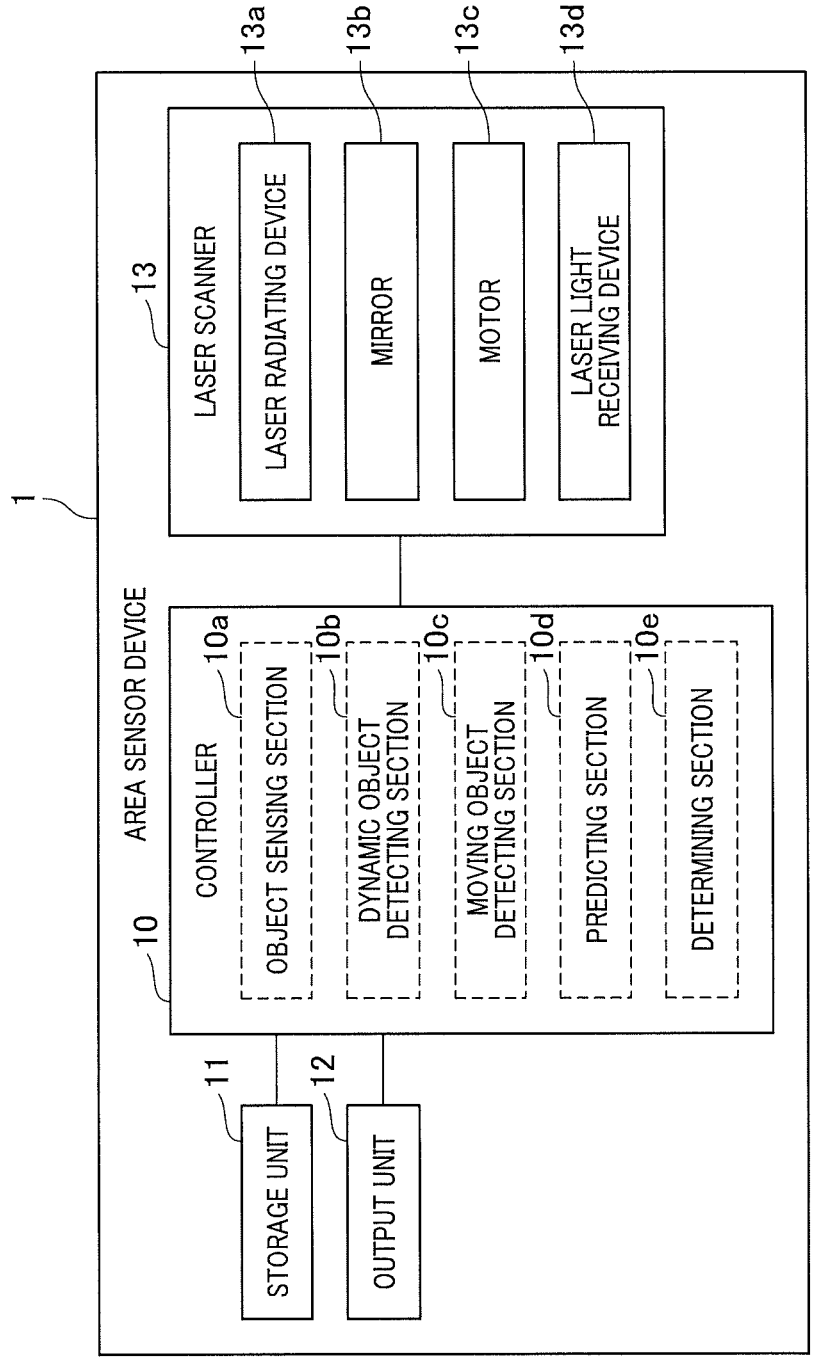
FIG. 2 is a block diagram illustrating the configuration of the area sensor device.
Figure 3:
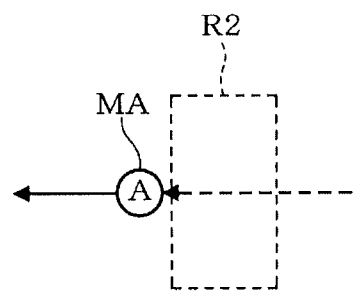
FIG. 3 is a view pictorially showing an after-passage sensing area.

As shown in FIG. 2, the area sensor device 1 is provided with a controller 10, a storage unit 11, an output unit 12, and a laser scanner 13. The controller 10 is composed of a microcomputer indulging a CPU, a ROM and a RAM which are not shown, and executes programs stored in the storage unit 11 to control drive of devices including the laser scanner 13. The controller 10 functionally includes an object detecting section 10a, a dynamic object detesting section 10b, a moving object detecting section 10c, a predicting section 10d and a determining section 10e. In the present embodiment, execution of software programs by the computer 10 functionally realizes such sections 10a to 10e.

Though described later, the object detecting section 10a performs an object sensing process shown in FIG. 5 to sense objects in the sensing area R1, and the dynamic object detesting section 10b preforms a dynamic object detecting process shown in FIG. 6 to sense objects in the sensing area R1. In addition, the moving object detecting section 10c performs a moving object detecting process shown in FIG. 7 to sense objects in the sensing area R1. The predicting section 10d is capable of predicting a before-passage position shown in FIG. 12 in a later-described second embodiment.

The determining section 10e uses, as described later, information showing an after-passage sensing area and states of the after-passage sensing area before and after a moving object passes, and based on such information, the determining section 10e determines whether or not there have occurred events of leaving objects behind and/or taking objects away. Further, the determining section 10e sets an after-passage sensing area R2 show in FIG. 3. This after-passage sensing area R2 is for determining whether or not a new object has been sensed in the area R2 after passage of a moving object. The after-passage sensing area R2 contains positions located adjacent to a position through which a sensed moving object passes. This after-passage sensing area R2 positionally changes as the moving object moves. Additionally if a plurality of moving objects are sensed, the after-passage sensing area R2 is set for each of the moving objects. Incidentally "the positions located adjacent to a position through which a sensed moving object passes" is designated based on a range within which movable portions of the moving object can move and/or a range to which the tips of such movable portions extend in a state where the moving object is stationary.

In the present embodiment, the after-passage sensing area R2 is set to be an area that includes at least the width of a trajectory (i.e., the width of a moving object) along which a moving object moves. Specifically, the after-passage sensing area R2 is set to have both a width in the vertical direction in FIG. 3, in which the width is set to be an amount of "the lateral width of the moving object+α" and a width in the lateral direction in FIG. 3, in which, if the moving object is a person, the width in the lateral direction is set to a range which can be reached by a person's hand, for instance. For example, when the moving object is supposed to be a person, the margin +α can be set to an amount providing a range which can be reached by a human's hand, i.e., a range which can be reached by the tip (hand) of a movable portion (arm) of a human serving as the moving object. As another example, the margin +α can be set to an amount providing a range in which a person can move with no collisions of the person's body and hands with obstacles (e.g., this range can be set as an avoidance distance expected to be necessary for a person to avoid obstacles; for example, the range is equal to a width of a single person). As a conclusion, it is sufficient that the after-passage sensing area R2 is set appropriately depending on types of moving objects assumed to pass there and possible behaviors or actions of moving objects.

The storage unit 11 is composed of, for example, a memory apparatus such as memory elements and/or HDDs which are not shown. The storage unit 11 is used to store various types of information such as computer programs and ranging information such as distances to objects detected in the sensing area R1. The output unit 12 is used to output results determined by the determining section 10e, in a mode in which the system informs an observer of the determined results.

The laser scanner 13 (which corresponds to an optical sensor) is provided with a laser scanner 13a radiating a laser beam, a mirror 13b, an electric motor 13c, and a laser reception device 13d. The mirror 13b reflects the radiated laser beam toward a scan area RO and also receives light reflected by objects in the scan area RO. The motor 13c drives the mirror 13b so that the mirror 13b rotates at a predetermined angular resolution and with predetermined scanning cycles and the laser reception device 13d receives the reflected light. Hence, the laser beam radiated form the laser radiation device 13a is reflected by objects which are present in the scan area RO, and then received by the laser reception device 13d, so that the received laser information is provided as detection points showing existence of some sort of objects. By the way, the configuration of the laser scanner 13 shown in FIG. 2 is just one example, and may developed into other structures, such as direct driving the laser scanner 13a itself (in which the mirror 13b is not used for the radiation)

The operations and advantages of the foregoing configuration will now be described.

Figure 4:
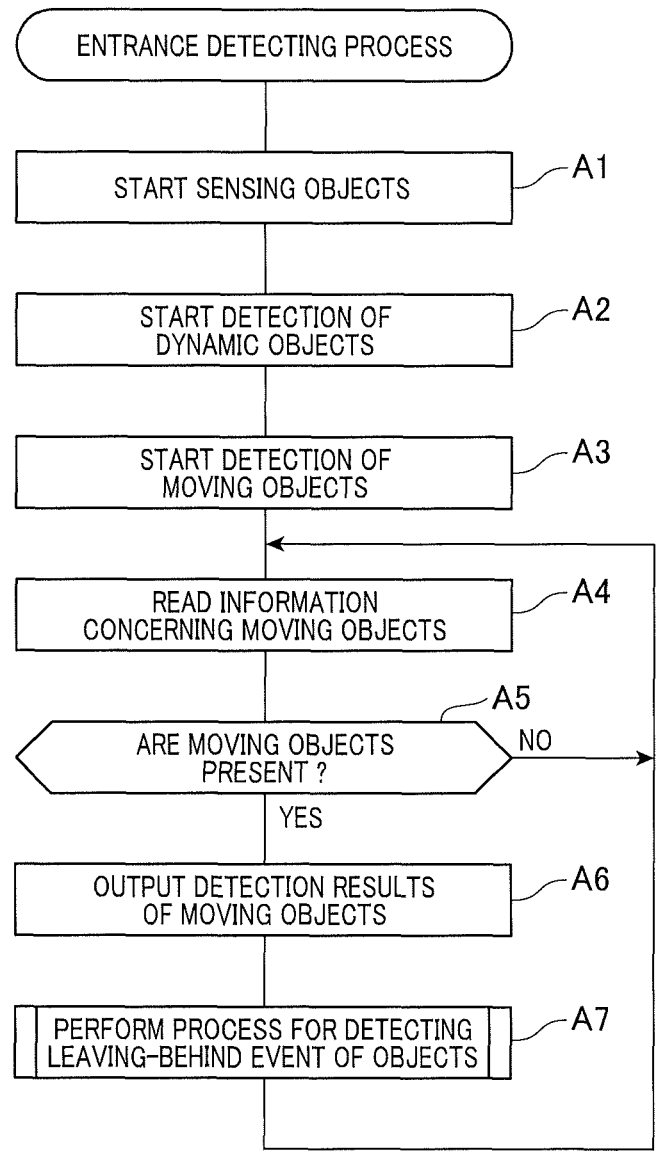
FIG. 4 is a flowchart showing an entrance detecting process performed by the area sensor device.

The area sensor device 1 performs repeatedly, at intervals, an entrance (i.e., going-in) detecting process shown in FIG. 4. In response to the start of this process, sensing objects is started (step A1), sensing dynamic objects is started (step S2), and sensing moving objects is started (step A3). In this embodiment, the phrase "sensing objects is started" means that the object sensing process shown in FIG. 5 is repeatedly executed at intervals. Accordingly, although not shown in FIG. 4 for the sake of a simplified description, the object sensing process runs continuously even at step A4 and steps after step A4 in the background of the area sensor device, practically, of the CPU. Additionally, the phrase "sensing dynamic objects is started" in step A2 and the phrase "sensing moving objects is started" are also the same in the interpretation as the above. Hereinafter, the object sensing process, the dynamic object detecting process, and the moving object detecting process will now described individually. Practically, these processes are carried out by the sections 10a-10c, such as the object detecting section 10a, but for simplifying the descriptions, these processes are described provided that the area sensor device 1 performs such processes for descriptive purposes.

<Object Sensing Process>

Figure 5:
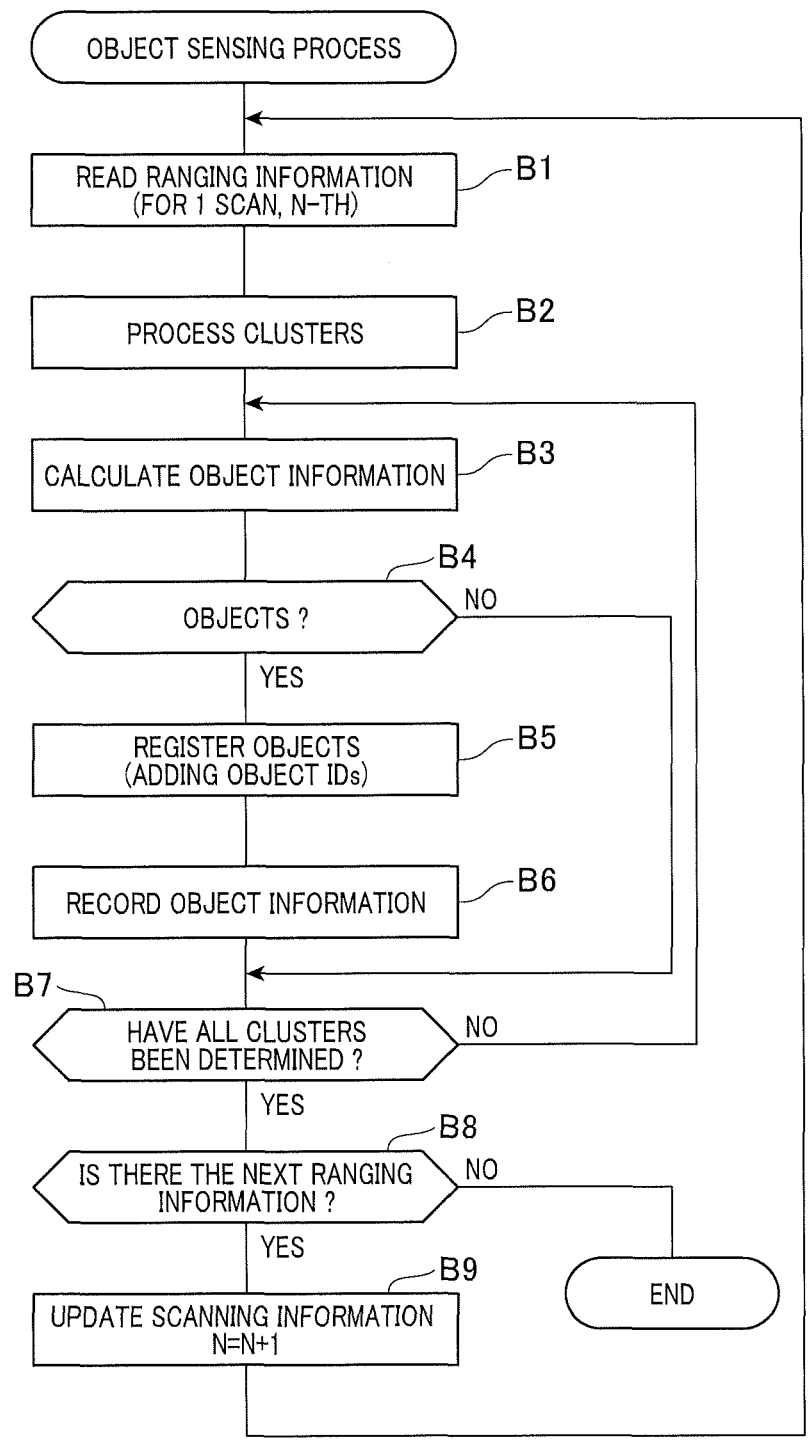
FIG. 5 is a flowchart showing on object sensing process performed by the area sensor device.
Figure 6:
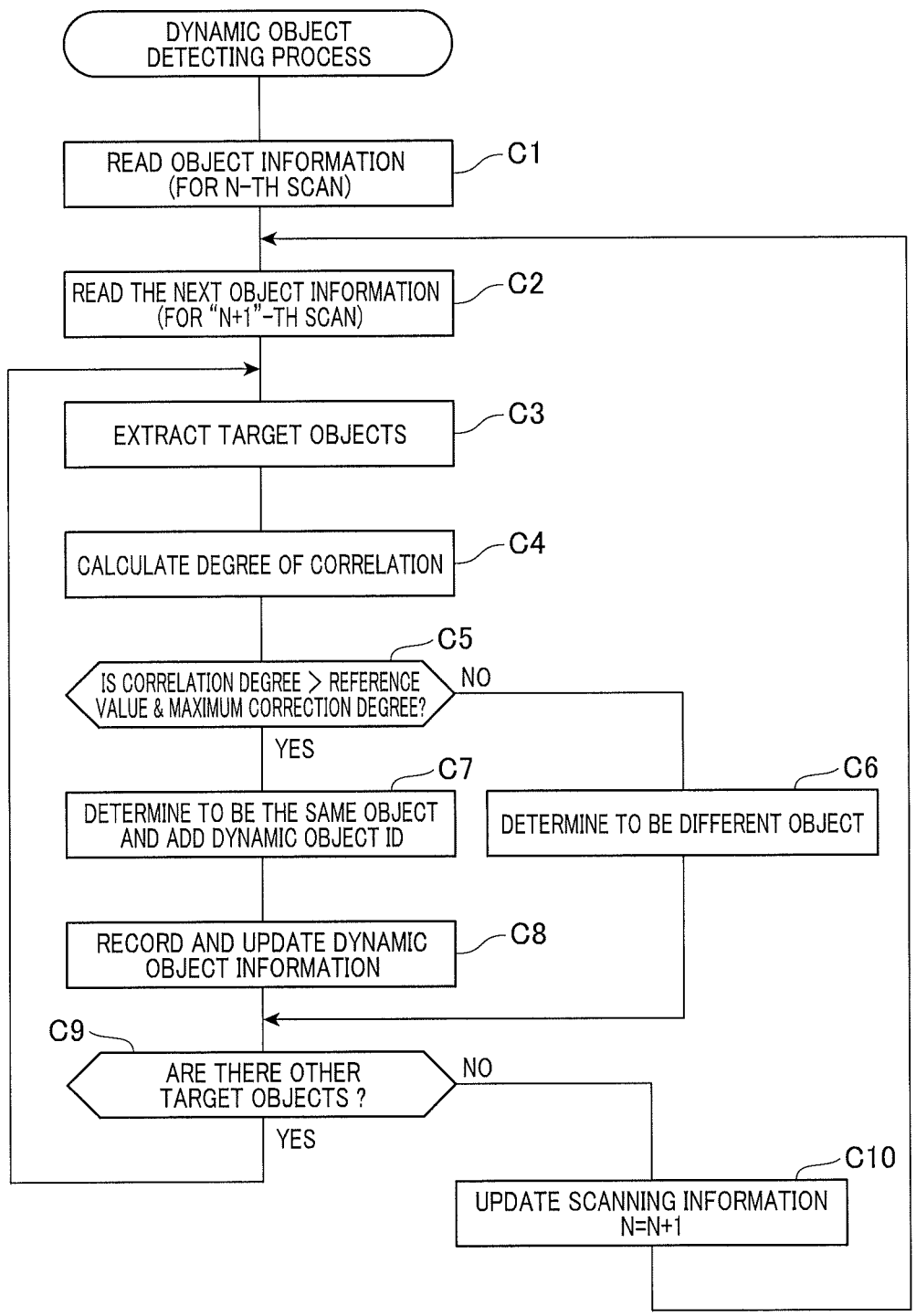
FIG. 6 is a flowchart showing a dynamic object detecting process performed by the area sensor device.

The area sensor device 1 starts the object sensing process shown in FIG. 5, in which the device 1 first reads ranging information (at the N-th scanning) for one scan (step B1).

The ranging information includes distances and a scanning angle detected in the sensing area R1. For example, in the case of FIG. 1, the ranging information at a time (time instant) T1 includes a distance L1 to an object MS, which is an obstacles, and a scanning angle θ1 directed thereto, a distance L2 to a moving object MA and a scanning angle θ1 directed thereto, and so on. The ranging information for several times of scanning is stored, and the N-th ranging information is read at step A1.

When the area sensor device 1 reads the ranging information, the device 1 proceeds to performance of a clustering process (step B2). In this clustering process, various detection points detected responsively to reflection of the laser beam by objects are determined as to whether or not they originate from the same object. A known technique of, for example, clustering detection points detected within a predetermined region is employed here to detect an object. Based on the clustering results, the device 1 then calculates information indicating objects (i.e., information such as a position, size, shape, and density shown by a group of detection points, which corresponds to positional information) (step B3). The device 1 then performs a determination as to whether or not such information shows an object (step B4). In this embodiment, if the calculated size and shape meets preset conditions, it is determined that the group of detection points shows an object. In the example shown in FIG. 1, the moving object Ma and an obstacle are determined as being objects.

When it is determined that, as shown in FIG. 1, there are objects (YES at step B4), the area sensor device 1 performs object registration by assigning object IDs to the objects (step B5). Hence, the objects present in the sensing area R1 are managed by the following process. Object information, i.e., information showing the objects, is then recorded in correspondence with the object IDs (step B6). If it is determined that the detection points do not result from objects, i.e., no objects exist (NO at step B4), the steps B5 and B6 are skipped.

The area sensor device 1 determines whether or not all the clusters have already been subjected to object detection, and if this determination is not completed for all the clusters (NO at step S7), the device returns its processing to step B3 to perform the object determination on the remaining clusters. Meanwhile, it is determined that this object determination has finished for all the clusters (YES at step B7), the processing is made to proceed with the next step of determining whether or not the next ranging information is left (step B8). If there is the next ranging information (YES at step B8), the scanning line information (variable N) is updated, i.e., incremented up to N+1 (step B9), then returning to step B1 to repeat the foregoing steps. When the determination for all the scanning lines is completed, i.e., there is no ranging information to be processed next (NO at step B8), the processing is ended. However, this object sensing process (and the scan of the sensing area R1) is repeated at intervals, as described.

<Dynamic Object Detecting Process>

The area sensor device 1 starts the dynamic object detecting process, in which the device 1 first reads the object information (at the N-th) recorded in the object sensing process (step C1). After this reading, the device 1 further reads the (N+1)-th object information (step C2). Then, a target object is extracted from the N-th object information (step C3), and a degree of correlation of the extracted target object with an object indicated by the (N+1)-th object information is calculated (step C4). At this step C4, the degree of correlation is calculated based on information showing whether the objects are the same in size and whether the objects are positioned within a predetermined range (i.e. whether the objects are present in a range which makes it possible to provide an interpretation that the same object moves).

The area sensor device 1 then determines whether or not the degree of correlation is over a reference value and is a maximum value (step C5). In other words, when a plurality of objects are stored as the "N+1"-th object information, it is determined such plural objects have the maximum degree of correlation. If the degree of correlation of the objects is below the reference value or not the maximum value (NO at step C5), it is determined that those objects are different from each other. In contrast, if the degree of correlation of the objects is over the reference value and is the maximum value (YES at step C5), it is determined that those objects stem from the same single object. Thus, a dynamic object ID is added to this object (step C7), and information concerning the object to which the dynamic object ID is attached is recorded as dynamic object information in an updated manner (step C8).

The area sensor device 1 determines if there are remaining target objects (step C9), and if such remaining target objects exist (YES at step C9), the device 1 proceeds to step C3. If there is no remaining target object (NO at step C9), the scanning information (i.e., the variable N) is updated, i.e., incremented to N+1 (step C10), before proceeding to step C2 for repetition of the foregoing steps.

<Moving Object Detecting Process>

Figure 7:
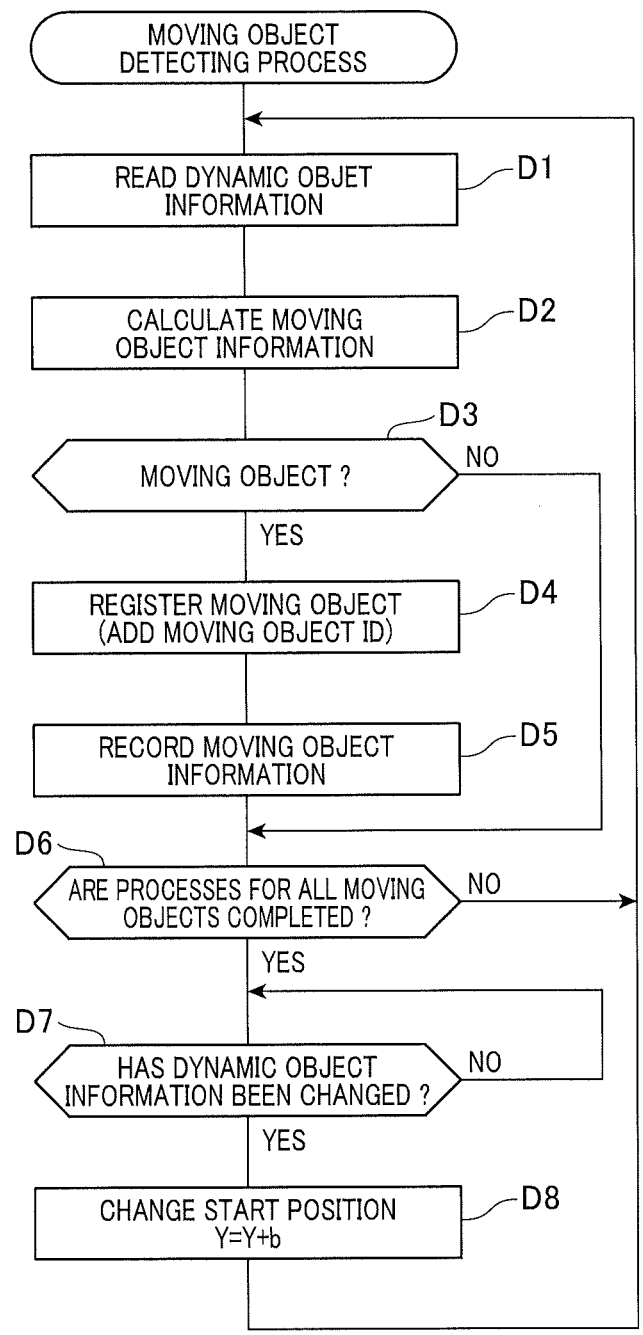
FIG. 7 is a flowchart showing a moving object detecting process performed by the area sensor device.

The area sensor device 1 starts the moving object detecting process shown in FIG. 7. In this process, the dynamic object information (the Y-th to the "Y+a"-th; a variable Y indicates a start point at which the dynamic object information reads first and a variable "a" indicates a span for reading the dynamic body information) recorded in the dynamic object detecting process is read (step D1), and based on the read information, moving body information is calculated (step D2). This moving body information includes information showing a position, size, shape, moving speed, and moving direction of the object to which the dynamic object ID is added.

Based on the dynamic object information calculated (i.e., based on changes of the dynamic object information) with time, the area sensor device 1 determines whether or not an object with a dynamic object ID is a moving object (step D3). If the object is determined as a moving object (YES at step D3), a moving object ID is added for recordation of the moving object (step D4), and information concerning the object with the moving object ID attached thereto is recorded as moving object information (step D5). However, if it is determined that the object cannot be regarded as a moving object (NO at step D3), the steps D4 and D5 are skipped.

After this, the area sensor device 1 determines whether or not the above determination to find moving objects from all the dynamic objects indicated by the read dynamic object information has been completed (step D6). If such determination is not completed (NO at step D6), the processing returns to step D1 for repetition of the foregoing steps for detecting moving objects.

When the area sensor device 1 determines that the determination for all the dynamic objects has been completed (YES at step D6), the device 1 further determines whether the dynamic object information has been updated (step D7). If there is no update (NO at step D7), the processing waits before the next step by repeating this step D7. If the dynamic object information has been updated (YES at step D7), the start point Y for the determination is changed to Y+b (step D8), before return to step D1 for repetition of the forgoing steps. Here, the variable b indicates the next dynamic object information which is the next to the dynamic object information which has now been determined, and b=a+1 is realized.

After starting, as described above, the object sensing process, the dynamic object detecting process, and the moving body detecting process, the area sensor device 1 reads the moving body information in the entrance detecting process shown in FIG. 4 (step A4), and determines whether or not the moving object is present (step A5). If it is determined that there is no moving object (NO at step A5), the processing waits for the next step by repeating steps A4 and A5. Meanwhile, when determining that there is a moving object (YES at step A5), the area sensor device 1 outputs a detected result of the moving object (step A6), and performs a leaving-behind sensing process (step A7).

Figure 8:
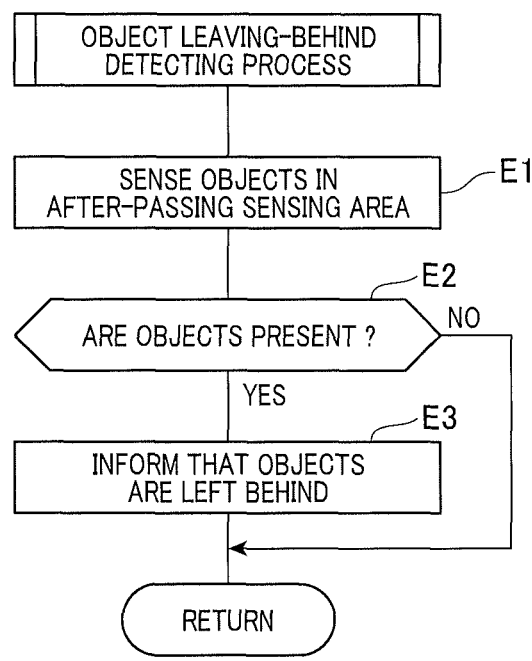
FIG. 8 is a flowchart showing a leaving-behind sensing process performed by the area sensor device.
Figure 9:
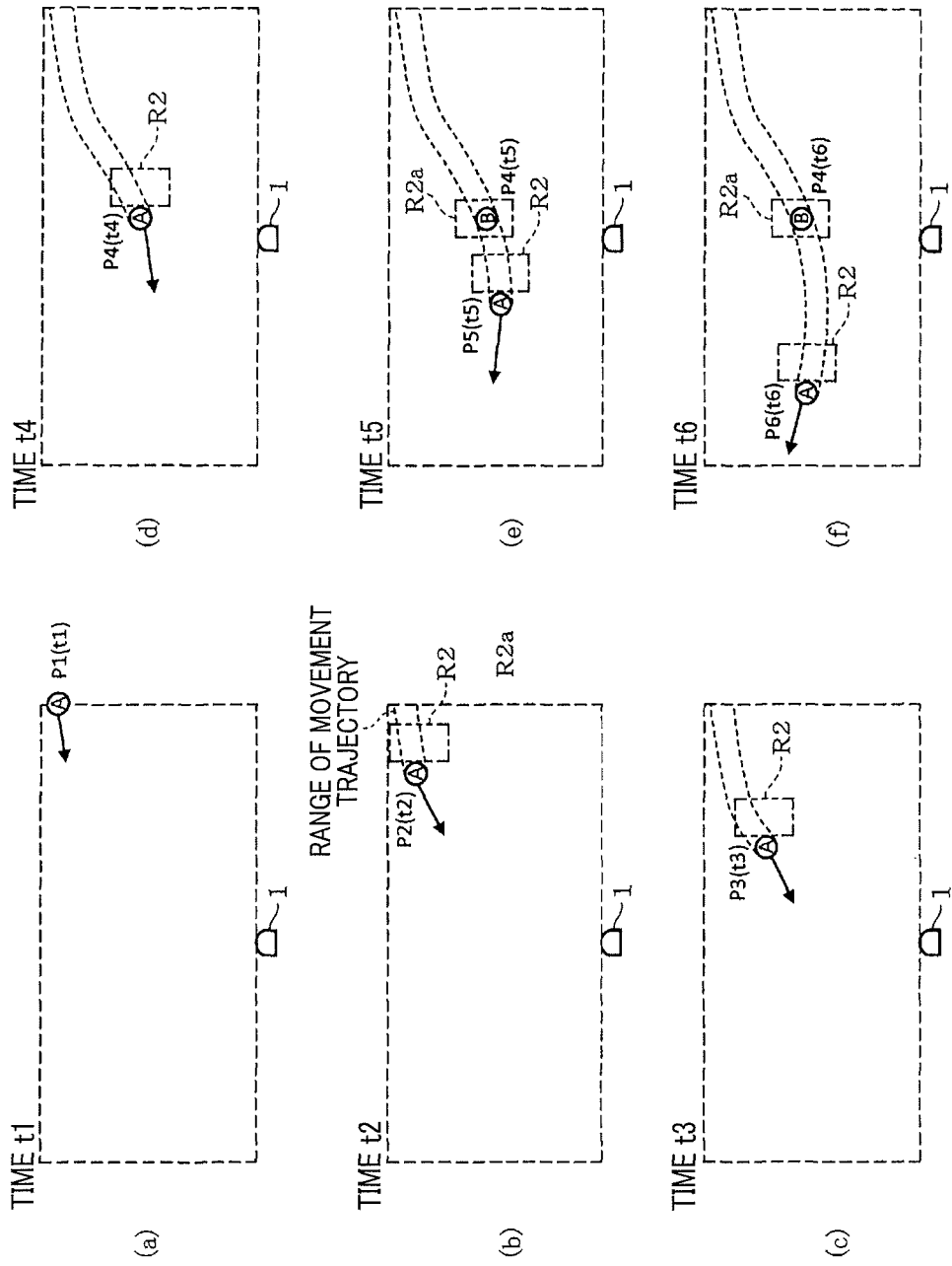
FIG. 9 is an illustration pictorially and time-sequentially showing a leaving-behind event occurring in the sensing area.

The leaving-behind sensing process is shown in FIG. 8, in which the area sensor device 1 tries to sense objects in an after-passage sensing area R2 for a predetermined determination period of time (step E1). Practically, as shown in FIG. 9 for instance, the leaving-behind sensing process 1 sets, as after-passage sensing area R2, a zone including an area brought by a moved trajectory along which a moving object MA has moved and being adjacent to the brought area, and senses the objects in this after-passage sensing area R2. As shown in exemplary illustrations (a) to (d) in FIG. 9, if any object is not sensed in the after-passage sensing area R2 during the times (the time instants) t1 to t4, but after the time t4, an object B is sensed in the after-passage sensing area R2.

The area sensor device 1 stores, as an after-passage sensing area R2a, the after-passage sensing area R2 in which the object B has been sensed. Then the device 1 checks whether or not the object B has stayed continuously in the after-passage sensing area R2a for, at least, the predetermined determination period of time. In the example of FIG. 9, it can be understood that the stay time of the object B exceeds the determination period of time at the time t6 shown in the illustration (f).

In this case, there is an object which has remained beyond the determination period of time (YES at step E2), so that the area sensor device 1 informs occurrence of a leaving-behind event (step E3). In other words, it is decided that the object B is left behind in the after-passage sending area R2a by the moving object MA, and information about this event is informed.

The present embodiment described above provides the following advantages.

The area sensor device 1 checks whether or not an object sensed in the after-passage sensing area R2 continues to remain there for a predetermined determination period of time or more. It is usual that, when there is an object in a path along which a moving object wants to move, the moving object moves with avoiding such an object in the path. It can be estimated that an object sensed in the after-passage sensing area R2 did not existed there before the passage (or transit) of the moving object so that the object has been left behind by the moving object. When moving objects intersect with other, both moving objects are moving. Hence, it is considered that, in this intersection case, the moving objects do not continue to be detected over the determination period of time. It is therefore possible to determine that an object sensed continuously in the after-passage sensing area R2 for the determination period of time or more has been left behind by a moving object. In this way, an event that an object left behind in the sensing area can be monitored.

In this case, the area sensor device 1 checks occurrence of the object leaving-behind event so as to follow movement of a moving object, whereby it is not required to register the background data beforehand. Without such registration, the object leaving-behind event which may occur in the sensing area R1 can be monitored.

Though it is not required to register the background data, the object leaving-behind event can be monitored even in a case shown in FIG. 9 where the obstacle shown in FIG. 1 is removed, i.e., even when the condition within the sensing area R1 has changed, thus saving labor for the registration. Accordingly a demand for monitoring the object leaving-behind event in the sensing area R1 can be satisfied, upgrading the security.

[Second Embodiment]

Referring now to FIGS. 10 to 13, a second embodiment of the present invention will now be described. The components of an area sensor device according to the present embodiment are the same as shown in the first embodiment.

Figure 10:
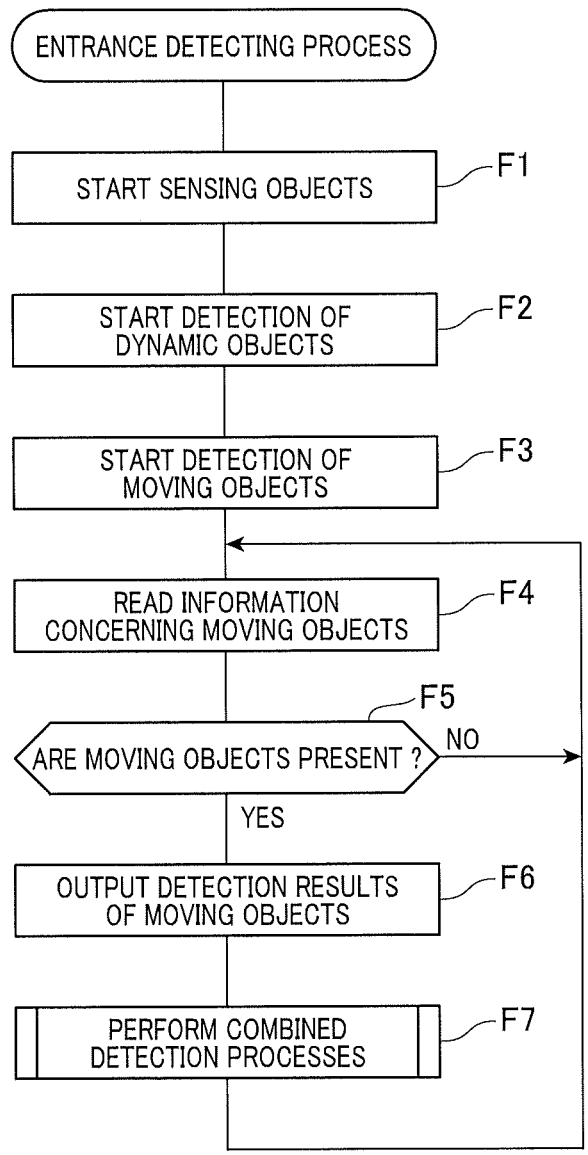
FIG. 10 is a flowchart showing an entrance detecting process performed by an area sensor device according to a second embodiment.

An area sensor device 1 according to the second embodiment is configured to perform an entrance (going-in) detecting process shown in FIG. 10. In the entrance detecting process shown in FIG. 10, steps F1 to F6 correspond to steps A1 to A6 shown in FIG. 4. For this reason, though omitting from being described in detail, the entrance detecting process includes start of sensing objects (step F1), start of detecting dynamic objects (step F2), start of detecting moving objects (step F3), reading the moving object information (step F4), determination whether or not a moving object is present (step F5), output of a detection result for the moving object (step F6) when a moving object is present (YES at step F5), and performance of a combined sensing process (step F7). This combined sensing process is a process which can detect both an object leaving-behind event, as described, and an object taking-away event.

Figure 11:
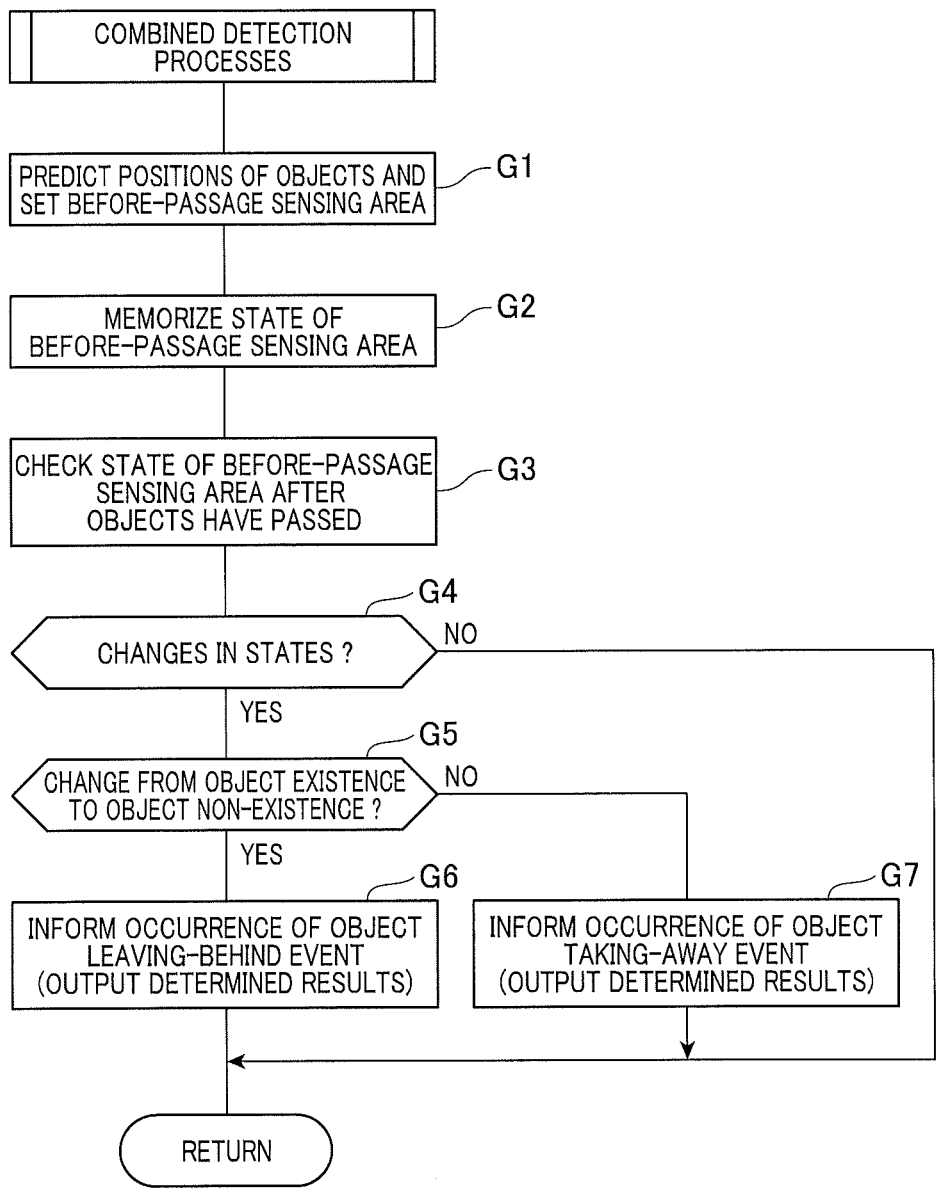
FIG. 11 is a flowchart showing a combined sensing process performed by the area sensor device.
Figure 13:
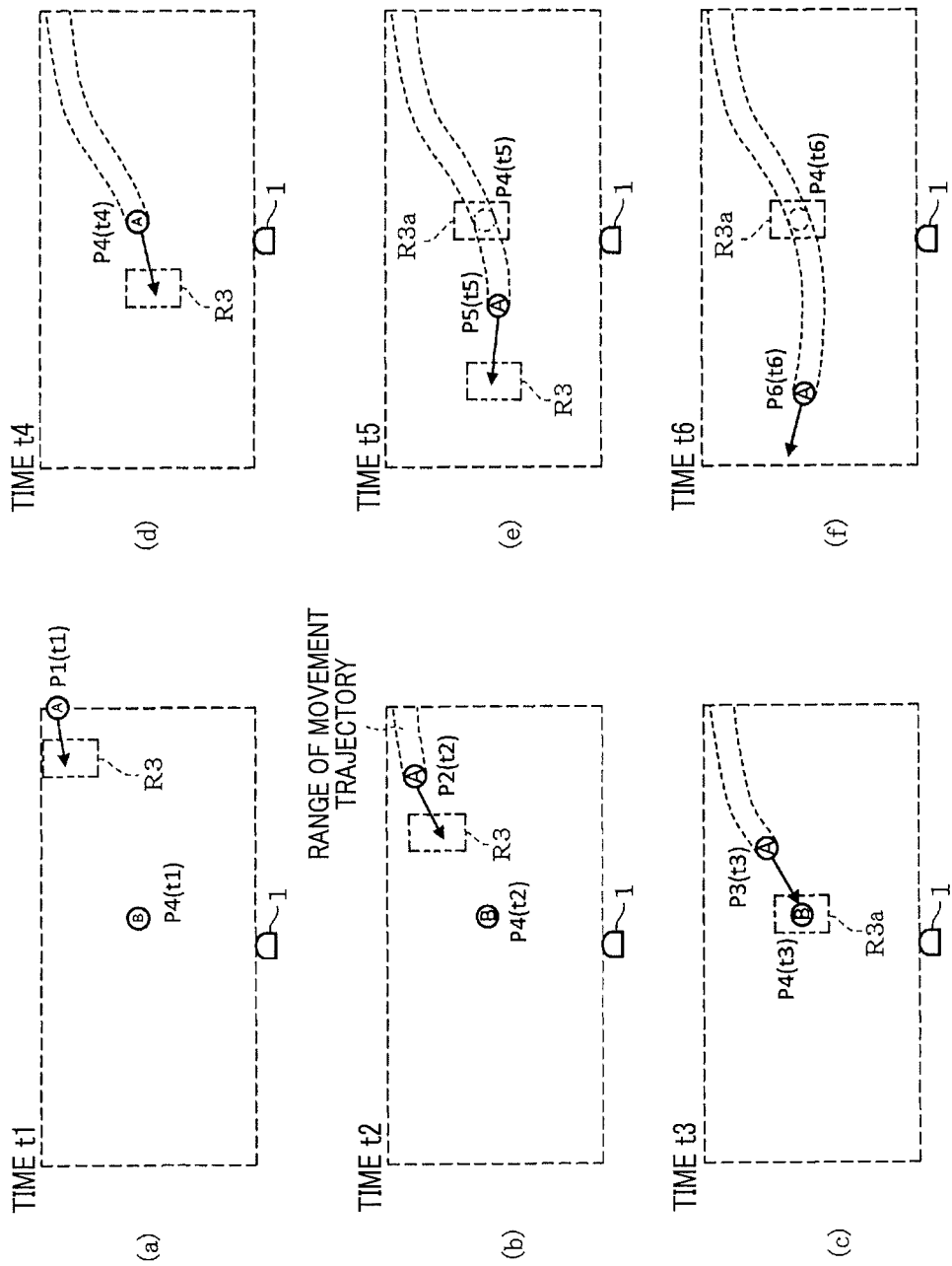
FIG. 13 is an illustration pictorially and time-sequentially showing a taking-away event.

In the combined sensing process shown in FIG. 11, the area sensor device 1 is configured to predict a position at which a moving object arrive after a predetermined period of time and sets the prediction in a before-passage sensing area (step G1). To be specific, as shown in FIG. 12(a), the area sensor device 1 uses the moving object information of an moving object MA to set, as a before-passage sensing area R3, a position predicted such that the moving object MA will pass after a predetermined period of time and a region closely surround the predicted position. This before-passage sensing area R3 can be treated as the after-passage sensing area R2 descried in the first embodiment when the moving object has passed, as shown in FIG. 12(b).

When setting the before-passage sensing area R3, the area sensor device 1 stores the state of this before-passage sensing area R3 (step G2). In this step G2, the state of this before-passage sensing area R3 includes, at least, information showing whether or not objects are present in the before-passage sensing area R3. Practically, as shown in FIG. 3(a), (b) etc., states of objects sensed in the before-passage sensing area R3 which has been set in the moving direction of the moving object MA are stored.

After the moving object has passed, the area sensor device 1 checks the state of the before-passage sensing area R3 (step G3). Practically, it is checked whether or not objects are present in the area R3. This checked after-passage state is then compared with the state stored at step G2 to know how the before-passage sensing area R3 has changed (step G4).

For example, in the before-passage sensing area R3 which is set as shown in FIGS. 13(a) and (b), there is no object sensed before and after the passage of the moving object, the area sensor device 1 can determine that there is no change in the state of the before-passage sensing area R3 (NO at step G4), whereby the processing returns.

In contrast, in a case shown in FIG. 13(c), it can be supposed that an object B is sensed in the before-passage sensing area R3 which has been set at step G1. In this situation, the area sensor device 1 stores the before-passage sensing area R3 from which the object has been sensed, as a before-passage sensing area R3a, for instance, and the state of the area R3a. And, when the moving object MA moves to reach a position P4 as shown in FIG. 13(d), it can be confirmed that the before-passage sensing area R3a is shown in FIG. 13(e) at the time t5 (step G3).

In this case, the object B which has sensed at the position P4 at the time t3 disappears, so that the area sensor device 1 determines that the state of the before-passage sensing area R3 has changed between before and after the passage (i.e., transit) of the moving object MA (YES at step G4). Moreover, in this case, the object B, which has been sensed till then, disappears, i.e., the state of the object has changed from an existence state to a non-existence state (YES at step G5), whereby it is determined that the object B has been taken away by the moving object MA. Responsively to this, the object taking-away event is informed to an observer for instance, thus the determined result being outputted (step G7).

Although omitted from being drawn, if any object was not sensed in the before-passage sensing area R3 but an object has been sensed in the before-passage sensing area R3 when the moving object has passed there, it can be estimated that the situation has changed from an object non-existence state to an object existence state (NO at step G5). In this case, it is determined that the moving object has left the object behind, so that this object leaving-behind event is informed to an observer or a system, thus the determined result being outputted (step G6).

As described, the area sensor device 1 according to the present embodiment can detect both object leaving-behind and taking-way events in a combined manner.

The present embodiment is thus able to provide the following advantageous effects.

When it is desired to monitor an object taking-away event in a monitoring area, it is necessary to know that there is present an object in the area. For this purpose, the conventional technique requires previous registration of the background data of the area, which imposes lots of time-consuming work on users who run the system. To improve this, the area sensor device 1 determines whether or not three is a change in the states of objects detected in the before-passage sensing area R3 between before and after the passage (transit) of a moving object. If the detected state shows a change from an object existence to an object non-existence, it is determined that an object taking-away event has occurred, while if the detected state shows a change from an object non-existence to an object existence, it is determined that an object leaving-behind event has occurred. Such determined results are outputted to an observer, for example. In this way, both events that an object is taken way by a moving object and an object is left behind by a moving object can be monitored in the sensing area by the same apparatus.

For such monitoring performances, the area sensor device 1 always checks how objects are sensed in the before-passage sensing area and information showing their sensed states is used as a reference for the event determination. Therefore previous registration of the background data is not required, thus lessening labor work in running the system.

In addition, the object taking-away and leaving-behind events can be checked depending on changes in detected states of objects between before and after passage of a moving body. Hence, with avoiding a processing load being raised largely, both object taking-away and leaving-behind events can be detected in a combined manner.

This also meets well a need for detecting an object leaving-behind event in the sensing area, raising a security level.

[Other Embodiments]

The present invention is not restricted to the structures exemplified in the foregoing embodiments, but may still be deformed or enlarged as shown below.

Figure 14:
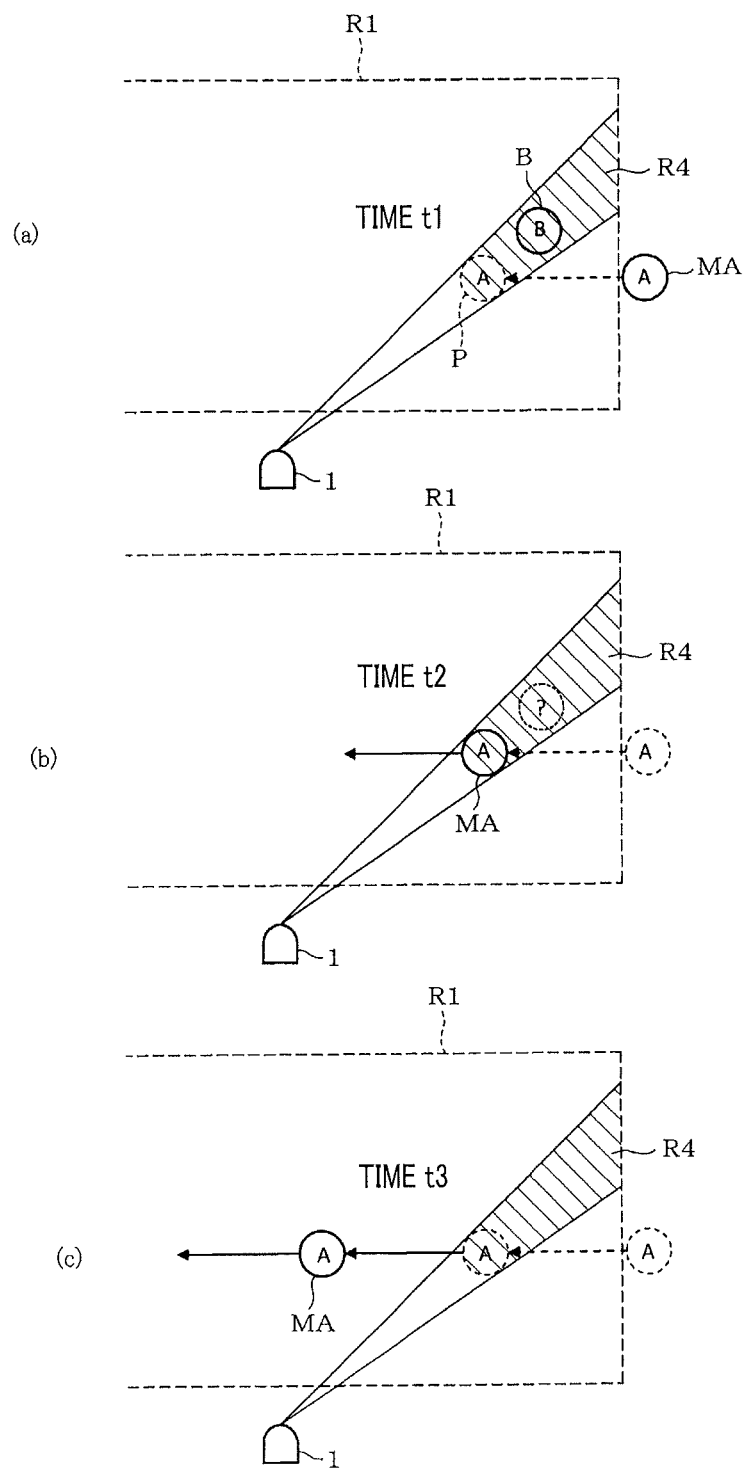
FIG. 14 is an illustration time-sequentially showing a leaving-behind event occurring in an undetectable area, which is according to another embodiment.

In the second embodiment, the before-passage sensing area R3 is set to be an area including a predicted position to which it is predicted that a moving object advances. This area R3 can be set to include other areas. For example, as shown in FIG. 14(a), when a moving object MA sensed at a time (time instant) t1 is positioned at a predicted position P at a time t2, the area sensor device 1 cannot check whether or not there are objects in a region R4 located farther than the moving object MA, because the field of view is interrupted by the moving object MA. With consideration this fact, the before-passage sensing area R3 can be set to include an undetectable area, like the area R4, which disables sensing objects due to interruption of the field of view by the moving object. In this case, even if an object B was sensed in the area R4 before passage of a moving object MA, the field of view is interrupted by the moving object MA in the scene shown in FIG. 14(b) due to a forward movement of the moving object MA. However, by setting the before-passage sensing are R3 to include the undetectable area, it can be determined that the object B is taken away by the moving object MA, as long as, as shown in FIG. 14(c), the object B cannot be sensed after the moving object MA has passed, in other words, as long as the state of the region R4 has changed between before and after the moving object has passed.

Figure 15:
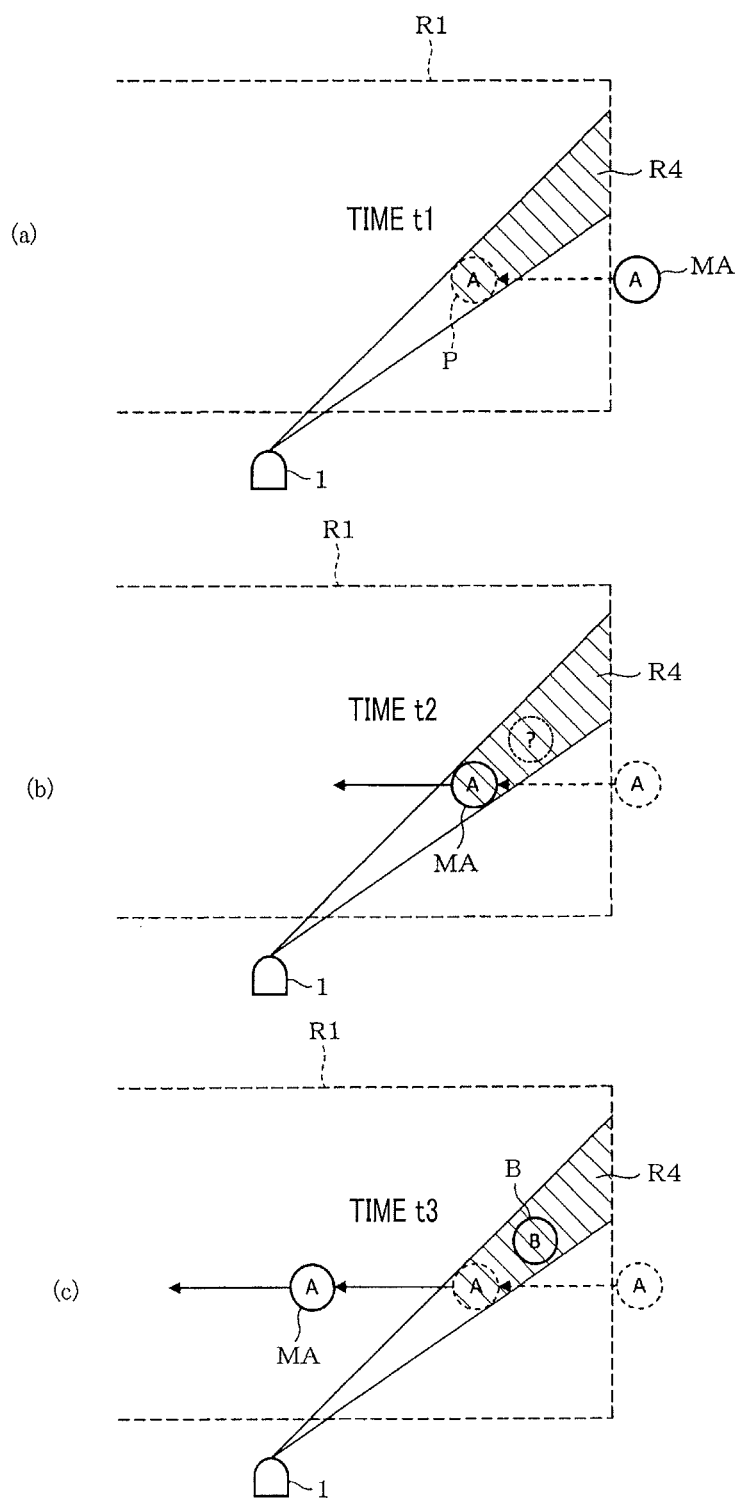
FIG. 15 is an illustration time-sequentially showing a taking-away event occurring in the undetectable area.

Additionally it can be supposed that an object was not sensed in the region R4 at a time t1 as shown in FIG. 15(a), the existence of an object could not detected in the area R4 at a time t2 as shown in FIG. 15(b), and an object B can be sensed for the first time in the region R4 at a time t3 as shown in FIG. 15(c). In this situation, it can be determined that the object B is left behind in the area R4 by the moving object MA.

In the first embodiment, the after-passage sensing area R2 has been exemplified as an area including a trajectory of movement of a moving object. Alternatively this area R2 may be set to include the undetectable area which disables the object sensing by being interrupted by a moving object. In this case, as shown in FIG. 15(b), the object leaving-behind event can be determined based on the fact that the moving object MA has moved and the object B has sensed after a lapse of the predetermined determination period of time described in the first embodiment.

In such a case, for example, when an object is sensed on an outer edge of the region R4 shown in FIG. 15(c), i.e., the object is too far from the moving object MA, this case can be removed from determination of an object leaving-behind event. In other words, the after-passage sensing area R2 may be set to a limited area whose distance from the moving object MA is within a predetermined amount, not limited to inclusion of the overall undetectable area (i.e., the region R4). In contrast, the whole region R4 may be set as the undetectable area in consideration of occurrence of a probable case where a plurality of persons entering the sensing area and one of them interrupts the field of view of the monitoring apparatus so as to produce the undetectable area.

By the way, in the foregoing embodiments, the optical sensor is exemplified as the area sensor device 1, but the present invention is not limited to this example. The camera imaging the sensing area is also used as such an optical sensor. When the area sensor device 1 is composed of a laser distance meter which usually scans horizontally a plane located highly a given level from the ground, it is difficult to sense objects placed on the ground. Instead, imaging means such as optical cameras can be used independent of levels above the ground, thus covering all objects in the sensing areas R1.

REFERENCE SIGN LIST

In the drawings, a reference number 1 shows an area sensor device (monitoring apparatus), a reference number 13 shows a laser scanner (optical sensor), a reference number R1 shows a sensing area, a reference number R2 shows an after-passage sensing area, a reference number R3 shows a before-passage sensing area, and a reference number R4 shows an undetectable area.

What is claimed is:

1. An apparatus for monitoring objects, comprising a processor configured to function as:
    an object detecting unit that detects objects in a sensing area by an optical sensor and calculates moving speeds and moving directions of the detected objects based on changes in positional information with time of the detected objects;
    a moving object determining unit that determines, of the objects detected by the object detecting unit, moving objects that meet a predetermined moving condition;
    an object-stay determining unit that determines whether or not another object is sensed in an after-passage sensing area that is set to each of the moving objects and whether or not, when the other object is sensed in the after-passage sensing area, the sensed other object has stayed at a sensed position in the after-passage sensing area for a predetermined period of time or more, the after-passage sensing area being set as a predetermined size area through which the corresponding moving object has passed; and
    an outputting unit that outputs results determined by the object-stay determining unit.

2. The apparatus of claim 1, wherein the after-passage sensing area is set to include an undetectable area that prohibits detection due to interruption of the optical sensor during the detection of the objects by the object detecting unit.

3. The apparatus of claim 1, wherein the after-passage sensing area for each of the moving objects is set to follow the moving object and has an area reachable by movable portions of the moving object.

4. The apparatus of claim 2, wherein the after-passage sensing area for each of the moving objects is set to follow the moving object and has an area reachable by movable portions of the moving object.

5. A method of monitoring a moving object, comprising:
    detecting objects in a sensing area by an optical sensor and calculating moving speeds and moving directions of the detected objects based on changes in positional information with time of the detected objects;
    first determining, of the objects detected, moving objects that meet a predetermined moving condition;
    second determining whether or not another object is sensed in an after-passage sensing area that is set to each of the moving objects and whether or not, when the other object is sensed in the after-passage sensing area, the sensed other object has stayed at a sensed position in the after-passage sensing area for a predetermined period of time or more, the after-passage sensing area being set as a predetermined size area through which the corresponding moving object has passed; and
    outputting results determined by the second determining step.

6. The method of claim 5, wherein the after-passage sensing area for each of the moving objects is set to follow the moving object and has an area reachable by movable portions of the moving object.

7. An apparatus for monitoring objects, comprising a processor configured to implement the steps of:
    sensing objects in a sensing area by an optical sensor and calculating moving speeds and moving directions of the sensed objects based on changes in positional information with time of the sensed objects;
    first determining, of the sensed objects, moving objects that meet a predetermined moving condition;
    second determining whether or not another object is sensed in an after-passage sensing area that is set to each of the moving objects and whether or not, when the other object is sensed in the after-passage sensing area, the sensed other object has stayed at a position in the after-passage sensing area for a predetermined period of time or more, the after-passage sensing area being set as a predetermined size area through which the corresponding moving object has passed; and
    outputting results determined by the second determining step.

8. The apparatus of claim 7, wherein the after-passage sensing area for each of the moving objects is set to follow the moving object and has an area reachable by movable portions of the moving object.

* * * * *